US008023893B2

(12) United States Patent  
Richman

(10) Patent No.: US 8,023,893 B2
(45) Date of Patent: Sep. 20, 2011

(54) METHOD AND SYSTEM FOR WIRELESS COMMUNICATION AMONG INTEGRATED CIRCUITS WITHIN AN ENCLOSURE

(75) Inventor: Russell Mark Richman, Schnecksville, PA (US)

(73) Assignee: Agere Systems Inc., Allentown, PA (US)

(*) Notice: Subject to any disclaimer, the term of this patent is extended or adjusted under 35 U.S.C. 154(b) by 1697 days.

(21) Appl. No.: 10/602,539

(22) Filed: Jun. 24, 2003

(65) Prior Publication Data

US 2004/0266363 A1 Dec. 30, 2004

(51) Int. Cl.
*H04B 7/00* (2006.01)
*H04K 3/00* (2006.01)
(52) U.S. Cl. ........................ 455/41.2; 455/66.1
(58) Field of Classification Search ........ 455/41.1–41.3, 455/66.1; 326/37–38, 82–83
See application file for complete search history.

(56) References Cited

U.S. PATENT DOCUMENTS

| | | | |
|---|---|---|---|
| 5,335,361 A * | 8/1994 | Ghaem | 455/501 |
| 5,754,948 A * | 5/1998 | Metze | 455/41.2 |
| 6,577,157 B1 * | 6/2003 | Cheung et al. | 326/38 |
| 6,690,741 B1 * | 2/2004 | Larrick et al. | 375/295 |
| 6,942,157 B2 * | 9/2005 | Nozawa et al. | 235/492 |

OTHER PUBLICATIONS

"Part 11: Wireless LAN Medium Access Control (MAC) and Physical Layer (PHY) Specifications," ANSI/IEEE Std 802.11 (1999).

* cited by examiner

*Primary Examiner* — Lee Nguyen
(74) *Attorney, Agent, or Firm* — Ryan, Mason & Lewis, LLP

(57) ABSTRACT

A method and apparatus are disclosed for wireless communication among integrated circuit devices within a single enclosure. Each of a plurality of integrated circuit devices within a single enclosure has one or more antennas that permit wireless communication. A signal destined for one or more integrated circuit devices within the same enclosure is transmitted by the transmitting integrated circuit device using an associated antenna. The transmitted signal is received by the antennas of each destination integrated circuit device. The present invention provides for pin to pin wireless transmission and reception among at least two integrated circuit devices. A plurality of channels may be achieved using known multiplexing techniques, such as time division multiplexing or the transmission of multiple signals at different carrier frequencies or on different antennas.

16 Claims, 2 Drawing Sheets

METHOD AND SYSTEM FOR WIRELESS COMMUNICATION AMONG INTEGRATED CIRCUITS WITHIN AN ENCLOSURE

FIELD OF THE INVENTION

The present invention relates generally to the communication among integrated circuit (IC) devices, and more particularly, to techniques for utilizing wireless technology to interconnect IC devices within a single enclosure.

BACKGROUND OF THE INVENTION

The interconnection of integrated circuit devices has traditionally been accomplished using wired technology, such as printed circuit and multi-wire boards. These technologies require a wired link embedded in or on a board or substrate that physically supports a plurality of IC devices and other components. The wired link may be comprised of an etched conductive trace or conventional wire embedded in the circuit board. An electrical connection between a terminal on the IC device and a via or pad connected to the wire trace facilitates the transmission of a signal from one device to another. While such interconnections are commonly employed method for interconnecting IC devices, they incur a number of problems that impact the cost and performance of the IC devices.

The wire traces and associated solder joints of both cited technologies are costly to manufacture and are susceptible to failure both during and after manufacturing. In addition, when wire traces are of a relatively long length, they generate cross-talk between signals and cause additional signal loss due to signal reflections and the resistance of the wire trace itself. This limits the attainable bandwidth of the interconnecting signals and, thus, the bandwidth of the IC devices themselves. In addition, the traces and terminal connections also consume space on the board or substrate that could otherwise be utilized for supporting a larger number of IC devices or eliminated to create smaller products. The interconnection of a relatively small number of IC devices may require hundreds or thousands of interconnections on a single board or substrate. This often requires complex routing, resulting in increased engineering and manufacturing costs.

In a similar manner, the interconnection of IC devices located on different boards or substrates within a single enclosure has traditionally been accomplished via wires, electrical cables, back-planes, fiber optic cables or a combination of the foregoing. Wires, electrical cables and back-planes are susceptible to the same signal loss, space requirements, routing and cost problems associated with the wire traces of a single board or substrate. This is compounded, however, by the greater distances encountered between IC devices on different boards or substrates and the usual need for additional interconnection components required to connect the cable or back-plane to a wired link. While fiber optic links between boards or substrates eliminate some of the signal loss and cross-talk problems associated with electrical cables, they have similar space and routing requirements and are typically more expensive than electrical interconnect solutions.

The wired technologies cited above are also utilized for system-level communications, i.e., between self-contained devices, such as computers, peripherals, network routers, Original Equipment Manufacturer (OEM) products and sub-assemblies. In addition, wireless technologies, such as the IEEE 802.11 standard for wireless local area networks or the Bluetooth standard, are commonly used for communication among these types of system-level devices. See, for example, "Information Technology: Telecommunications and Information Exchange Between Systems—Local and Metropolitan Area Networks—Specific Requirements," ANSI/IEEE Standard 802.11 (1999), incorporated by reference herein. Wireless links, however, have been traditionally restricted to this system-level domain due to their high cost and relatively low bandwidth compared to wired solutions. The conventional view has been that wireless links are too slow and expensive to compete with wired solutions for relatively short distances. In view of the foregoing, a need exists for a method and apparatus for interconnecting IC devices located on one or more boards or substrates within a single enclosure that overcome the problems and limitations of the prior art.

SUMMARY OF THE INVENTION

Generally, a method and apparatus are disclosed for wireless communication among integrated circuit devices within a single enclosure. Each of a plurality of integrated circuit devices within a single enclosure has one or more antennas that permit wireless communication. A signal destined for one or more integrated circuit devices within the same enclosure is transmitted by the transmitting integrated circuit device using an associated antenna. An antenna associated with each of the destination integrated circuits receives the transmitted signal. The antennas may be embodied, for example, as pins that are external to the integrated circuit device, or printed or etched on the integrated circuit device itself. The antennas may optionally be optimized for frequency or directional characteristics. In this manner, the present invention provides for pin to pin wireless transmission and reception among at least two integrated circuit devices. A plurality of channels may be achieved using known multiplexing techniques, such as time division multiplexing or the transmission of multiple signals at different carrier frequencies or on different antennas (spatial multiplexing). In addition, greater bandwidth can be achieved, if necessary, by pooling the bandwidth of several antennas, in a similar manner to serial bus arrangements, such as the PCI Express standard.

The present invention thus allows wireless communication between two devices on the same printed circuit board, between multiple devices, or between different circuit boards within the same enclosure.

A more complete understanding of the present invention, as well as further features and advantages of the present invention, will be obtained by reference to the following detailed description and drawings.

DETAILED DESCRIPTION

Figure 1:
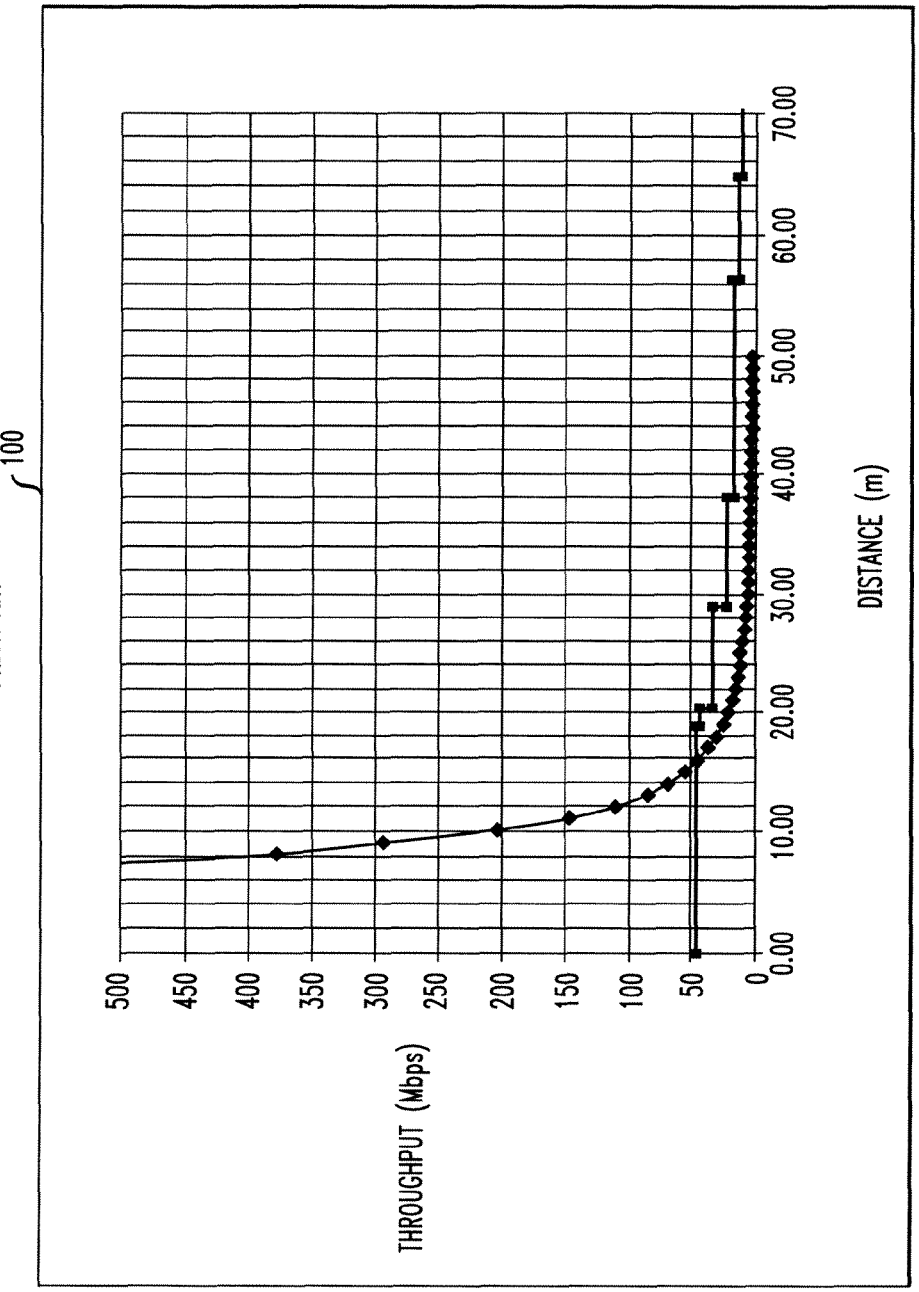
FIG. 1 illustrates a throughput (Mbps) versus interconnection distance for a number of wireless technologies.

As previously indicated, wireless communication among devices has traditionally been restricted to the domain of system-level communications due to its high cost and relatively low bandwidth compared to wired solutions. The present invention recognizes that existing and emerging wireless standards can be exploited to permit wireless communication among integrated circuit devices within a single enclosure. In particular, new wireless technologies that exhibit ultra high bandwidths over shorter distances can now be exploited for inter-device connections. FIG. 1 is a graph 100 illustrating the bandwidths that can be attained for integrated circuit interconnection utilizing IEEE 802.11 and ultra wide band (UWB) wireless technologies 110, 120, respectively. As shown in FIG. 1, ultra-high bandwidths of 500 Mbps or more can be attained over distances typical of on-board interconnections, generally on the order of centimeters and limited to a distance of two to five meters.

Figure 2:
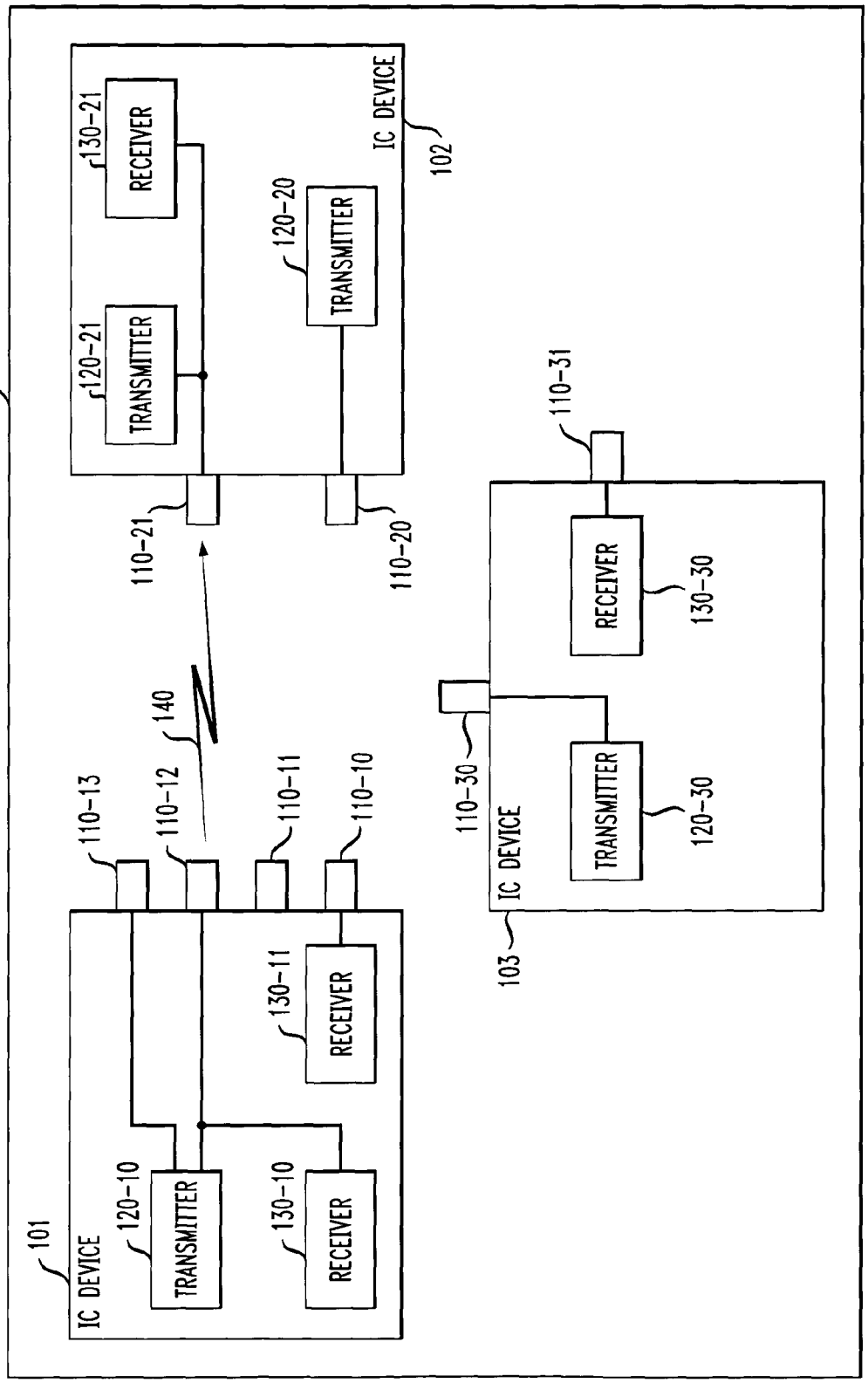
FIG. 2 shows a schematic block diagram of a plurality of integrated circuit devices interconnected by a wireless link.

FIG. 2 shows a schematic block diagram of an exemplary wireless solution in accordance with the present invention for interconnecting IC devices, such as IC devices 101, 102, 103. Each integrated circuit device 101, 102, 103 comprises one or more antenna 110, one or more transmitters 120 and/or one or more receivers 130. The antenna 110 may be embodied, for example, as pins on the IC or printed or etched directly on the IC itself. A signal originating in integrated circuit device 101 may be transmitted, for example, via antenna 110-12 to another integrated circuit device 102 located within the same enclosure 150 as the originating device 101. The transmitted signal 140 is received by receiver 130-21 via antenna 110-21. In addition, other IC devices 103 located within the same enclosure 150, including the IC device transmitting the signal, may also receive the transmitted signal 140. The enclosure 150 may be, for example, the housing of a self-contained device that is normally sold as a single unit, such as a computer, digital television, peripheral, network router, OEM product or sub-assembly.

A variety of protocols and technologies can be utilized for the wireless interconnection links, such as IEEE 802.11a, UWB or Bluetooth. In addition, new technologies for ultra-wide bandwidths are being standardized by organizations such as the IEEE, including the IEEE 802.15 Working Group for Wireless Personal Area Networks. All of these technologies are designed for communications between self-contained components, e.g., computers, peripherals, and high-definition televisions. As previously indicated, such wireless technologies exhibit extremely high bandwidths at relatively short distances and are thus suitable for interconnecting IC devices in accordance with the present invention.

A plurality of communication channels may be achieved using known multiplexing techniques, such as time division multiplexing or the transmission of multiple signals at different carrier frequencies or on different antennas. Each channel may be destined for any combination of IC devices 101, 102, 103, independent of the other channels and other transmitted signals. For example, each IC device 101, 102, 103 may transmit a single signal, or may transmit multiple signals at different carrier frequencies. The transmitted signals may be transmitted using one or more antennas 110. Thus, a single antenna 110 may facilitate the transmission of several signals to one or more destination IC devices. Each transmitted signal may be destined for any combination of IC devices 101, 102, 103, independent of the other transmitted signals. In addition, greater bandwidth can be achieved, if necessary, by pooling the bandwidth of several antennas, in a similar manner to serial bus arrangements, such as the PCI Express standard.

Each receiver 130 may be designed to receive a single specified carrier frequency, or may be capable of tuning to one or more carrier frequencies to receive one or more transmitted signals 140. Thus, a single antenna may facilitate the reception of several signals from one or more transmitting IC devices. In addition, if the transmitted signal 140 is time-division multiplexed, the receiving IC device 101, 102, 103 may demultiplex the transmitted signal 140 to receive one or more channels.

It is to be understood that the embodiments and variations shown and described herein are merely illustrative of the principles of this invention and that various modifications may be implemented by those skilled in the art without departing from the scope and spirit of the invention.

I claim:

1. A method for wireless communication among first and second integrated circuit devices within an enclosure, said method comprising the steps of:
    transmitting a signal using a first antenna associated with said first integrated circuit device in accordance with an ultra wide band wireless standard; and
    receiving said signal using a second antenna associated with said second integrated circuit device within said enclosure, wherein at least one of said first and second antennas is a pin on said first and second integrated circuit device.

2. The method of claim 1, wherein said first and second antennas are incorporated in said first and second integrated circuit devices.

3. The method of claim 2, wherein at least one of said first and second antennas is fabricated on said first or second integrated circuit device.

4. The method of claim 1, wherein said signal comprises one or more channels.

5. The method of claim 1, wherein one or more signals are transmitted by said first antenna using one or more associated sub-carrier frequencies.

6. The method of claim 1, wherein said signal is time-division multiplexed.

7. The method of claim 1, wherein said signal is frequency-division multiplexed.

8. The method of claim 1, wherein said signal is spatially multiplexed.

9. The method of claim 1, wherein said enclosure is a housing of a self-contained device.

10. A method for wireless communication by an integrated circuit device within an enclosure, said method comprising the step of:
    transmitting a signal using an antenna associated with said integrated circuit device in accordance with an ultra wide band wireless standard to a second integrated circuit device within said enclosure, wherein said antenna is at least one pin of said integrated circuit device.

11. The method of claim 10, wherein said signal comprises one or more channels.

12. The method of claim 10, wherein said enclosure is a housing of a self-contained device.

13. An integrated circuit device within an enclosure, comprising:
    at least one circuit for transmitting a signal in accordance with an ultra wide band wireless standard; and
    an antenna for transmitting said signal in accordance with said ultra wide band wireless standard to a second integrated circuit device within said enclosure, wherein said antenna is at least one pin of said integrated circuit device.

14. integrated circuit device of claim 13, wherein said signal comprises one or more channels.

15. The integrated circuit device of claim 13, wherein said enclosure is a housing of a self-contained device.

16. The integrated circuit device of claim 13, wherein said antenna is incorporated in said integrated circuit device.

* * * * *

UNITED STATES PATENT AND TRADEMARK OFFICE
CERTIFICATE OF CORRECTION

PATENT NO.        : 8,023,893 B2                                    Page 1 of 1
APPLICATION NO.   : 10/602539
DATED             : September 20, 2011
INVENTOR(S)       : Russell Mark Richman It is certified that error appears in the above-identified patent and that said Letters Patent is hereby corrected as shown below:

In claim 1, column 4, line 16, "and" should be replaced by -- or --.

Signed and Sealed this
Eighteenth Day of December, 2012

David J. Kappos
*Director of the United States Patent and Trademark Office*